Jan. 22, 1935. M. H. BENNETT 1,988,827
ELECTRICALLY HEATED TOOL
Filed Oct. 7, 1932 2 Sheets-Sheet 1
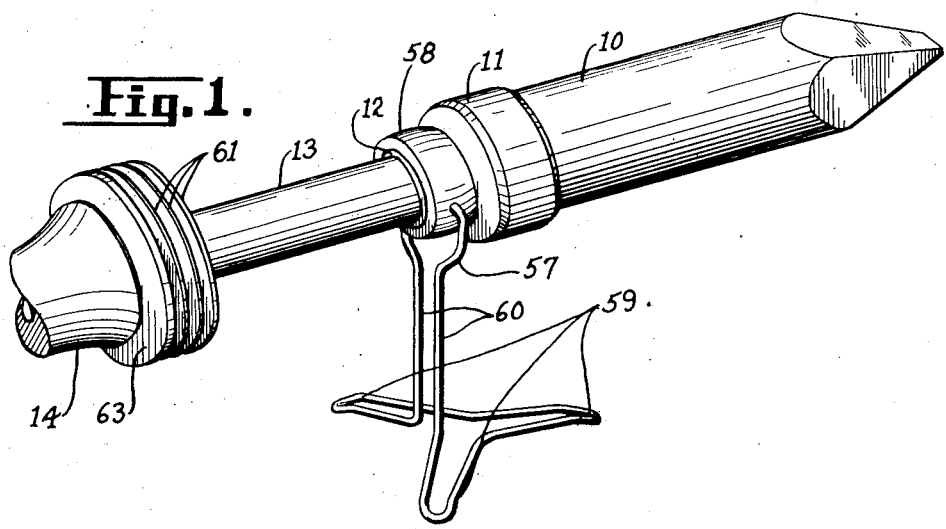
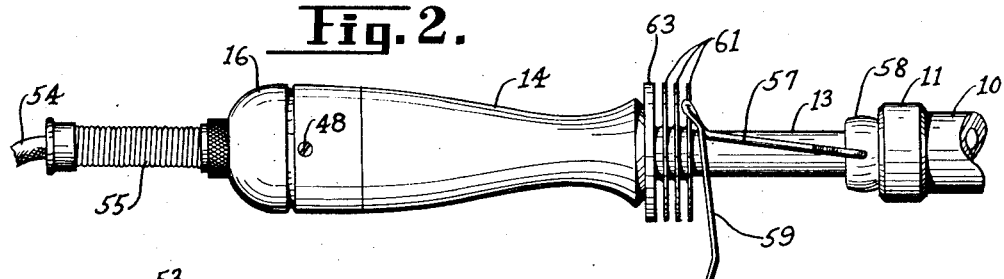
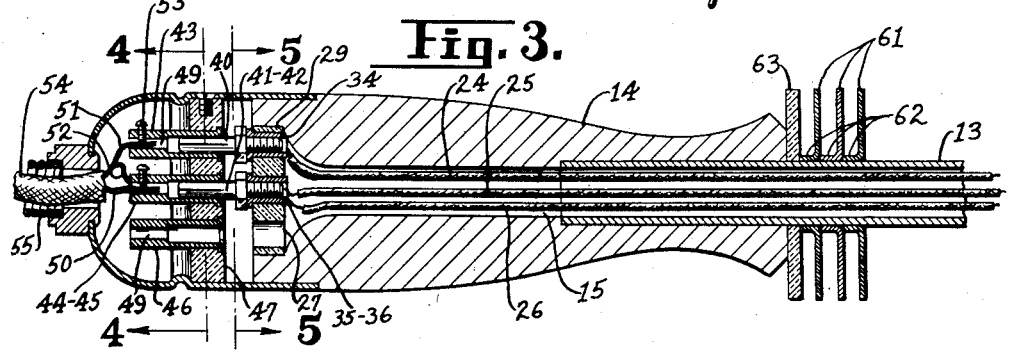
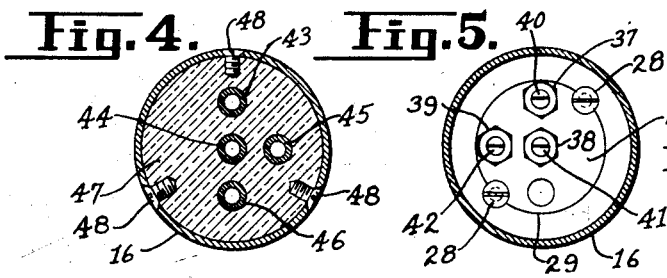
INVENTOR
Morris H. Bennett.
BY
H. G. Manning
ATTORNEY

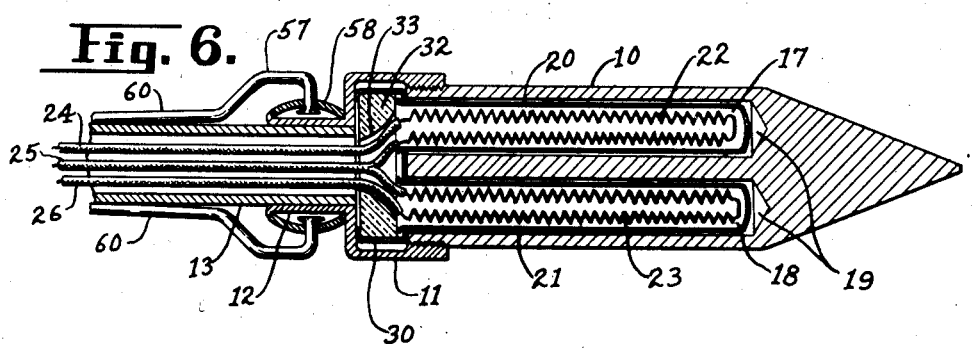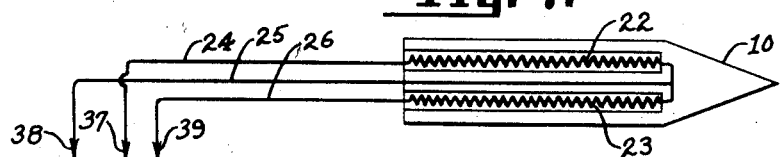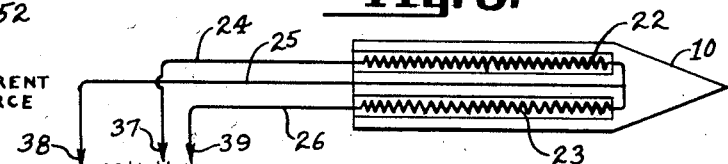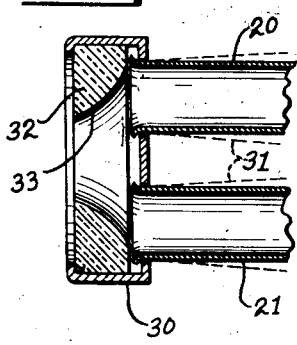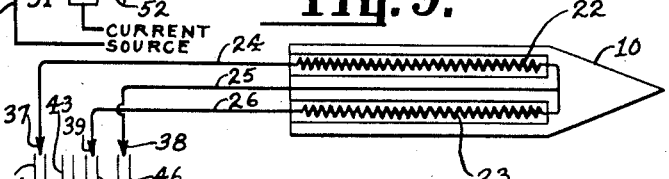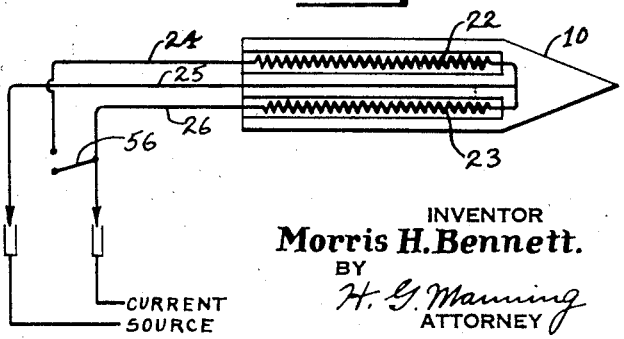

Patented Jan. 22, 1935

1,988,827

UNITED STATES PATENT OFFICE 1,988,827

ELECTRICALLY HEATED TOOL

Morris H. Bennett, Waterbury, Conn., assignor to Scovill Manufacturing Company, Waterbury, Conn., a corporation of Connecticut Application October 7, 1932, Serial No. 636,701

2 Claims. (Cl. 219—26)

This invention relates to electrically heated tools, and more particularly to portable tools, such as soldering coppers, branding irons, and analogous devices.

One object of this invention is to provide an electrically heated tool in which both the working point or "bit" and the electric heating elements contained therein are readily detachable.

A further object is to provide a device of the above nature in which the heating element will be flexibly mounted in the bit, and having means carried by the handle for varying the intensity of the heat.

A further object is to provide a device of the above nature having a series of radiating fins and a single non-conducting baffle for reducing the flow of heat from the heating elements to the handle.

A further object is to provide a device of the above nature provided with a shiftable frame adapted to serve the dual purpose of a bit support and a finger guard.

A further object is to provide a device of the above nature which will be simple in construction, inexpensive to manufacture, easy to install and manipulate, ornamental in appearance, and very efficient and durable in use.

With these and other objects in view there have been illustrated in the accompanying drawings several forms in which the invention may be conveniently embodied in practice.

In the drawings:

Fig. 1 shows a partial perspective view of a soldering copper embodying the invention, the frame being shown as supporting the heated bit in an elevated position.

Fig. 2 is a view of the handle and associated parts on a slightly reduced scale, showing the frame in position to serve as a guard.

Fig. 3 is a full-sized longitudinal sectional view of the handle and associated parts.

Fig. 4 is a cross-sectional view taken on the line 4—4 of Fig. 3, looking in the direction of the arrows.

Fig. 5 is a cross-sectional view taken on the line 5—5 of Fig. 3, looking in the direction of the arrows.

Fig. 6 is a longitudinal sectional view of the soldering bit and shank, showing the heating elements mounted therein.

Fig. 7 is a diagrammatic representation of the electrical circuits, as connected for maximum heat intensity with two elements in "parallel".

Fig. 8 is a diagrammatic representation of the electrical circuits, as connected for medium heat intensity with one element inactive.

Fig. 9 is a diagrammatic representation of the electrical circuits, as connected for minimum heating intensity with the two elements in "series".

Fig. 10 is a diagrammatic representation of the electrical circuits of a modified form of the invention, in which a manually operated switch of conventional form is employed for controlling one of the two heating elements.

Fig. 11 is an enlarged fragmentary sectional view of the heating elements and the cup for receiving the ends thereof.

Referring now to the drawings in which like reference numerals denote corresponding parts throughout the several views, the numeral 10 indicates a soldering "bit", "point", or "tip", preferably formed of copper, having its rear end closed by a metal cup 11, from which extends an integral hollow rear cylindrical projection 12 adapted to embrace and be secured, as by welding or spinning, to a tubular shank 13.

In order to prevent corrosion due to possible oxidation at high temperatures, and to prevent the bit from becoming soldered or being otherwise "stuck" within the cup 11, the latter is preferably formed from stainless steel or similar material. The connecting shank 13 is provided on its rear end with a handle 14, formed from wood or similar non-conducting material, said handle being centrally bored lengthwise, as at 15, for receiving and securely supporting a considerable portion of the rear end of the shank 13. The handle 14 is covered at its end by a removable metal cap 16.

Heat is supplied to the bit 10 by means of two slender pencil-type electrical heating members 17 and 18, loosely fitted within a pair of symmetrically disposed chamber 19, drilled into the mass of the copper bit 10. Each of the heating elements 17 and 18 consists of a thin walled tube 20, 21, preferably of copper, closed at its front end and containing resistance heating wires or coils 22, 23, preferably wound upon and covered with suitable electrically insulating refractory material, such as asbestos, filling the tubes. Current is supplied to the coils 22 and 23 by three insulated conductors 24, 25 and 26, which pass rearwardly through the shank 13 and handle 14, and are adapted to be attached to the ends of three cylindrical flanged bushings 34, 35 and 36, tightly fitted within an insulating transverse plate 27, secured as by screws 28 in a recess 29 within the handle 14 and located at the end remote from the bit 10.

As a mounting for the tubes 20 and 21, provision is made of an enlarged short metal cup 30, preferably of copper, having a pair of apertures in its base through which the open ends of each of said tubes 20 and 21 are adapted to be passed and loosely spun over, as shown in Fig. 11. As will be clear from this construction, a certain degree of flexibility of the tubes 20 and 21, as shown by the dotted lines 31 in Fig. 11, will be permitted. In order to provide an insulating backing for the heating elements and terminals of the associated conductors 24, 25 and 26, provision is made of a circular block or washer 32, preferably formed from refractory insulating material, such as porcelain or the like. The block 32 is adapted to rest within the metal cup 30, being retained therein by inwardly spinning the open end thereof, and said block 32 has a central smooth tapered opening 33 surrounding the conductors 24, 25 and 26.

The bushings 34, 35 and 36 are tapped to receive three plugs 37, 38 and 39, which have resilient split terminals 40, 41 and 42 adapted to selectively receive a plurality of metal sockets 43, 44, 45 and 46, said sockets being tightly fitted within an enlarged insulating block 47 firmly secured, as by screws 48, within the cap 16. In view of the fact that there are but three plugs for the four sockets, there will be two possible angular positions in which the cap 16 may be attached to the handle 14.

The rear ends of the sockets 43, 44, 45 and 46 lying within the domed portion of the cap 16, are drilled as at 49, to receive the conducting lead wires 50, 51 and 52, said wires being secured in place, as by binding screws 53. Current is supplied from any suitable source by a two-wire conductor cord 54, one conductor of which is the wire 50, and the other being divided within the cap 16 to form the wires 51 and 52. The cord 54 is preferably provided with the usual metal coil 55 secured to the cap 16 and forming a flexible guard therefor.

The electrical connections for "high" heat intensity are shown diagrammatically in Fig. 7. The plug 38 is there shown connected to the central conductor 25, which is the common lead from the two heating coils 22 and 23, and is adapted to be inserted into the central socket 44 for connection to the lead-in wire 50. The plugs 37 and 39 are connected respectively to the conductors 24 and 26, which lead to the free ends of the heating coils 22 and 23, and said plugs 37 and 39 are adapted to be inserted into the sockets 43 and 45, both of which are connected to the other lead-in wires 51 and 52. The socket 46 is a "dummy". Thus, each of the two coils 22 and 23 has full line voltage applied to it, and the full heat of both coils will under these conditions be communicated to the bit 10.

Fig. 8 shows the electrical arrangement for "medium" heat when the cap 16 has been attached in the other angular position with the plugs 37 and 39 engaging the sockets 45 and 46 respectively. The plug 38, as before, enters the socket 44, and the socket 46 being a "dummy", with no external electrical connection, the heating coil 23 will not be energized. Assuming the resistances 22 and 23 to be of equal value, since the unit 22 is the only one then energized, it will be seen that only half the amount of heat will be generated and communicated to the soldering bit 10, as in the first arrangement.

In Fig. 9 is shown diagrammatically a modified wiring arrangement, the resistances 22 and 23 being connected in series to cause a low heat to be produced. If desired, a three-heat arrangement may be produced by the use of a suitable switch, not shown, so that the arrangements of Figs. 7, 8 and 9 may be obtained at the will of the operator.

Fig. 10 shows a modified arrangement, wherein only two plugs and sockets are employed. In this form, so long as the cap 16 remains in place, the resistance unit 23 will be permanently connected to the supply circuit. The unit 22 may, however, be switched into "parallel" with said unit 23 at the discretion of the operator, as by the use of a conventional form of switch 56 when "high" heat is desired, conveniently positioned on the handle 14.

For the double purpose of supporting the tool in a slightly inclined elevated position above the work bench when not in use, and for acting as a finger guard when the tool is in use, provision is made of a frame 57 formed preferably from stiff wire, and pivotally attached to a ferrule 58 as by bending the extremities of said wire inwardly into a pair of diametrically opposed holes thereof. The ferrule 58 is fitted over the rear projection 12 of the cup 11 and is secured thereto, as by spinning up the end of said projection 12. The base of the frame 57 is formed with three radially disposed projecting loops 59 which, when resting on a level surface, form a sort of "crow's-foot" to provide a stable support for the soldering copper, keeping the bit 10 in an elevated position. The frame is formed also with substantially parallel members 60 adapted to grip the shank 13 when swung up out of the way. The projecting parts 59 will then serve as guards to prevent the operator's hand from slipping down the tool.

In order to minimize the amount of heat reaching the handle 14, provision is made of a plurality of heat radiating fins 61, three in this instance, each comprising a metal disc having an inner upturned boss 62 about its central opening, and adapted to be frictionally secured to the outer surface of the tubular shank 13 in intimate thermal contact therewith. As a further protection for the operator, provision is made of a circular baffle plate 63 of heat insulating material, such as "Bakelite", said plate being adapted to be tightly mounted on the tubular shank 13 between the group of radiating fins 61 and the handle 14.

While there have been disclosed in this specification several forms in which the invention may be embodied, it is to be understood that these forms are shown for the purpose of illustration only, and that the invention is not to be limited to the specific disclosures, but may be embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In an electrically heated tool, a hollow elongated operating bit having a plurality of longitudinal chambers, a plurality of tubular metal covered electrical heating members adapted to be located within said chambers respectively, an enlarged cup member having a plurality of apertures in its base for embracing said tubular members, said members having open ends spun outwardly into locking engagement with said apertures, and means passing through said cup for supplying current to said heating members.

2. In an electrically heated tool, a hollow elongated operating bit having a plurality of longitudinal chambers, a plurality of tubular metal covered electrical heating members adapted to be located within said chambers respectively, an enlarged cup member having a plurality of apertures in its base for embracing said tubular members, said members having open ends spun outwardly into locking engagement with said apertures, an annular insulating washer in said cup for engaging said spun-over ends, the free end of said cup being spun inwardly into locking engagement with said washer, and means passing through said washer for supplying current to said heating members.

MORRIS H. BENNETT.